9045X
J. Harmony.
Granary.
Patented Aug. 20, 1835.
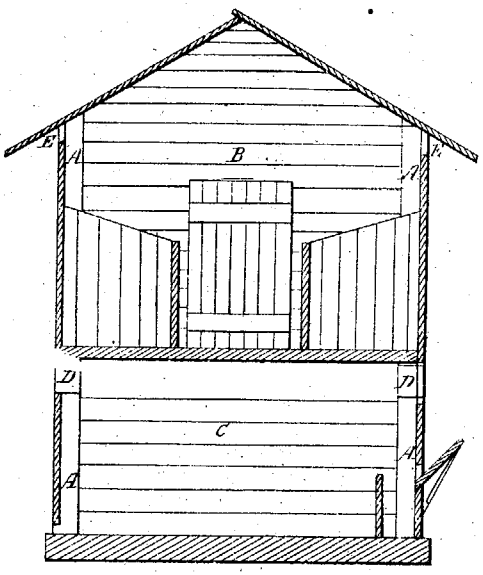
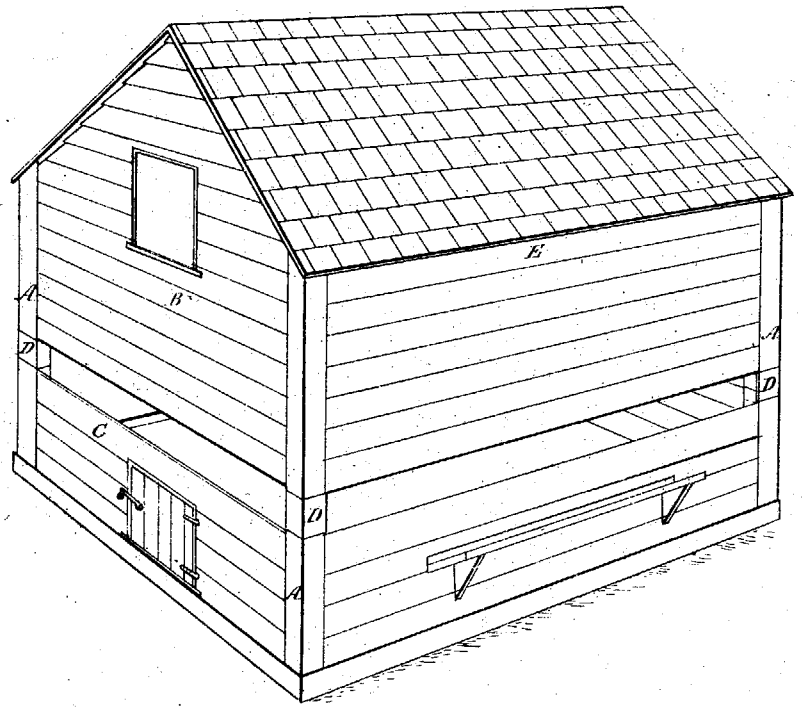

Aug. 20. 1835 17[illegible]

John L. Harmony Chambersburg Penn

Letters Patent

The Schedule referred to in these Letters Patent and making part of the
same containing a description in the words of the said John Harmony himself
of his improvement in the construction of granaries for protecting & preserving wheat
& other grain from the attacks of the insects commonly denominated Weevils To all to whom these presents shall come. Be it known that I John Harmony of the
town of Chambersburgh in the County of Franklin and State of Pennsylvania have in
vented a new and useful improvement in the construction of Granaries for protecting
& preserving wheat and other grain from the attacks of the insects commonly de
nominated Weevils and that the following is a full and exact description of the
construction of the same as invented & improved by me. My improvement consists
in introducing a hog pen or sheep pen either under or very close to a suitable room
or apartment into which the grain is to be put and I have found by repeated
experiment that the effluvia of the pen or some such cause operates as a complete pre
=ventative against the attacks of the Weevil. also should the grain be infested by
them when so deposited they will speedily leave it; thus securing the farmer by
this very simple contrivance against the ravages of an enemy who has been
known to destroy whole crops in a few weeks and that too after he has incurred
all the expense and trouble of transferring it from the field to the stackyard I also
apply my improvement to grain in the stacks by constructing a pen under the stack
in a similar manner when it is found necessary. Although there are many ways
in which my granary may be constructed I deem it incumbent on me to describe
that which I prefer. Upon four or more posts either set in the ground or resting on
a proper foundation in an upright position I construct a house with proper doors
for introducing the grain weatherboarded and floored sufficiently tight to prevent
the grain from passing out and to exclude the [illegible] in The roof should project several
feet on each side so as to shelter certain holes or openings for the admission of fresh
air under the eaves. The floor should be raised a convenient heighth from the
ground say 5 or 6 feet and the corner posts at least should be in one piece reaching

[illegible] 9045X from the ground to the top of the house. A suitable inclined floor resting on sleepers so as to raise it from the ground is next to be laid for the pen or stye, and surroun=ded by planks secured to the posts by which the sides of the pen are formed, the grainary constituting a roof to shelter it from sun and rain. The upright posts that sustain the house are each to be covered with a sheet of tin lapped round them just under the floor and secured by nailing or any other means in common use resorted to for the purpose of preventing the rats &c. from climbing up. When a stack is to be protected a simple platform or roof strongly supported is raised above the pen or stye and the grain stacked upon it instead of the ground. The what I claim as new and as my invention or discovery for which I ask Letters Patent is the combination of a Hog pen or Sheep pen with the Grainery as herein set forth whereby the vermin are either expelled from or prevented from attacking the Grain. In Testimony that the foregoing is a true specification of my said im=provement I have hereunto set my hand this twenty first day of July 1835

Witnesses
Samuel Keller
Charles Harmony

John Harmony

[illegible]
[illegible]

660 [illegible]

(Patented Aug. 20. 1835)

(Drawing)